US007845582B2

(12) United States Patent
Joseph et al.

(10) Patent No.: US 7,845,582 B2
(45) Date of Patent: Dec. 7, 2010

(54) SPRAY GUN RESERVOIR WITH OVERSIZE, FAST-FILL OPENING

(75) Inventors: Stephen C. P. Joseph, Woodbury, MN (US); Daniel E. Siltberg, White Bear Township, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 329 days.

(21) Appl. No.: 10/534,093

(22) PCT Filed: Oct. 27, 2003

(86) PCT No.: PCT/US03/33855

§ 371 (c)(1),
(2), (4) Date: May 6, 2005

(87) PCT Pub. No.: WO2004/060574

PCT Pub. Date: Jul. 22, 2004

(65) Prior Publication Data

US 2006/0049277 A1 Mar. 9, 2006

(30) Foreign Application Priority Data

Dec. 18, 2002 (GB) ................................ 0229401.5

(51) Int. Cl.
*A62C 13/62* (2006.01)
*A01G 25/14* (2006.01)
*B65D 88/54* (2006.01)
*F16K 15/14* (2006.01)

(52) U.S. Cl. ........................ 239/302; 239/346; 239/347; 239/309; 239/318; 239/327; 239/362; 239/590; 239/328; 239/329; 239/375; 239/376; 239/377; 239/378; 239/379; 239/340; 239/350; 239/341; 239/337; 239/323; 239/600; 239/DIG. 14; 222/325; 222/95; 222/83; 222/105; 137/843

(58) Field of Classification Search ................. 239/302, 239/346, 347, 309, 318, 327, 362, 590, 328, 239/329, 345, 375, 376, 377, 378, 379, 340, 239/350, 341, 337, 323, 600, DIG. 14; 222/325, 222/95, 83, 105; 137/843
See application file for complete search history.

(56) References Cited

U.S. PATENT DOCUMENTS 1,703,384 A * 2/1929 Birkenmaier ............... 239/301

(Continued)

FOREIGN PATENT DOCUMENTS

CA 1006450 3/1977

(Continued)

OTHER PUBLICATIONS

Service Bulletin, SB-4-043-D, Replaces SB-4-043-C, DeVilbiss, "120175 (GFC-502) 32 OZ. Aluminum Gravity Feed Cup With Disposable Lid and Cup Liner," May 2000.

*Primary Examiner*—Len Tran
*Assistant Examiner*—Steven M Cernoch
(74) *Attorney, Agent, or Firm*—Steven E. Skolnick

(57) ABSTRACT

A spray gun reservoir has an oversize central opening 130 at one end allowing liquid to be added to the reservoir for fast filling with reduced risk of spillage. A cap member 132 is connectable to the reservoir and has a spout 115 providing a fluid outlet of reduced size relative to the opening 130 for connection to the spray gun. The reservoir can be disconnected from the cap member 132 when it is desired to add liquid to the reservoir. In this way, the reservoir can be refilled in use.

41 Claims, 7 Drawing Sheets

U.S. PATENT DOCUMENTS

| | | | | | |
|---|---|---|---|---|---|
| 1,997,291 | A | | 4/1935 | Barroll | |
| 2,051,518 | A | * | 8/1936 | Cunningham | 222/325 |
| 2,177,032 | A | | 10/1939 | Baumgardner | |
| 2,228,861 | A | * | 1/1941 | Wegener | 222/325 |
| 2,612,404 | A | | 9/1952 | Andersson | |
| 3,066,872 | A | | 12/1962 | Kobee | |
| 3,157,360 | A | | 11/1964 | Heard | |
| 3,182,866 | A | | 5/1965 | Rowe | |
| 3,198,438 | A | | 8/1965 | Hultgren | |
| 3,211,324 | A | | 10/1965 | Sapien | |
| 3,227,305 | A | | 1/1966 | Enssle | |
| 3,236,459 | A | | 2/1966 | McRitchie | |
| 3,255,972 | A | * | 6/1966 | Hultgren | 239/318 |
| 3,401,842 | A | | 9/1968 | Morrison | |
| 3,432,104 | A | | 3/1969 | Kaltenbach | |
| 3,507,309 | A | | 4/1970 | Johnson | |
| 3,674,074 | A | | 7/1972 | Lavis | |
| 3,757,718 | A | | 9/1973 | Johnson | |
| 3,773,211 | A | | 11/1973 | Bridgman | |
| 3,780,950 | A | | 12/1973 | Brennan | |
| 3,784,039 | A | | 1/1974 | Marco | |
| 3,790,017 | A | | 2/1974 | Fitzpatrick et al. | |
| 3,790,021 | A | | 2/1974 | Bailey | |
| 3,934,746 | A | | 1/1976 | Lilja | |
| 4,035,004 | A | | 7/1977 | Hengesbach | |
| 4,043,510 | A | | 8/1977 | Morris | |
| 4,122,973 | A | | 10/1978 | Ahern | |
| 4,151,929 | A | | 5/1979 | Sapien | |
| 4,321,922 | A | | 3/1982 | Deaton | |
| 4,339,046 | A | | 7/1982 | Coen | |
| 4,347,948 | A | | 9/1982 | Hamada et al. | |
| 4,379,455 | A | | 4/1983 | Deaton | |
| 4,383,635 | A | | 5/1983 | Yotoriyama | |
| 4,403,738 | A | | 9/1983 | Kern | |
| 4,406,406 | A | | 9/1983 | Knapp | |
| 4,516,693 | A | | 5/1985 | Gaston | |
| 4,558,792 | A | | 12/1985 | Cabernoch et al. | |
| 4,562,965 | A | * | 1/1986 | Ihmels et al. | 239/346 |
| 4,586,628 | A | | 5/1986 | Nittel | |
| 4,657,151 | A | | 4/1987 | Cabernoch | |
| 4,712,739 | A | | 12/1987 | Bihn | |
| 4,760,962 | A | | 8/1988 | Wheeler | |
| 4,781,311 | A | | 11/1988 | Dunning et al. | |
| 4,811,904 | A | * | 3/1989 | Ihmels et al. | 239/345 |
| 4,813,556 | A | | 3/1989 | Lawrence | |
| 4,836,764 | A | | 6/1989 | Parkinson | |
| 4,930,644 | A | | 6/1990 | Robbins, III | |
| 4,936,511 | A | | 6/1990 | Johnson et al. | |
| 4,946,558 | A | | 8/1990 | Salmon | |
| 4,951,875 | A | * | 8/1990 | Devey | 239/104 |
| 4,971,251 | A | | 11/1990 | Dobrick et al. | |
| 5,069,389 | A | * | 12/1991 | Bitsakos | 239/289 |
| 5,094,543 | A | | 3/1992 | Mursa | |
| 5,123,571 | A | | 6/1992 | Rebeyrolle et al. | |
| 5,143,242 | A | | 9/1992 | Millasich | |
| 5,143,294 | A | * | 9/1992 | Lintvedt | 239/328 |
| 5,186,828 | A | | 2/1993 | Mankin | |
| 5,209,501 | A | | 5/1993 | Smith | |
| 5,211,289 | A | | 5/1993 | Matthews | |
| 5,328,095 | A | | 7/1994 | Wickenhaver | |
| 5,337,921 | A | | 8/1994 | Wilson et al. | |
| 5,385,251 | A | | 1/1995 | Dunn | |
| 5,421,489 | A | * | 6/1995 | Holzner et al. | 222/207 |
| 5,424,086 | A | | 6/1995 | Walker | |
| 5,454,488 | A | | 10/1995 | Geier | |
| 5,460,289 | A | | 10/1995 | Gemmell | |
| 5,492,242 | A | | 2/1996 | Gall | |
| 5,582,350 | A | * | 12/1996 | Kosmyna et al. | 239/345 |
| 5,607,082 | A | | 3/1997 | Cracauer | |
| 5,617,972 | A | | 4/1997 | Morano et al. | |
| 5,655,714 | A | * | 8/1997 | Kieffer et al. | 239/318 |
| D386,654 | S | | 11/1997 | Kosmyna | |
| 5,789,684 | A | | 8/1998 | Masek et al. | |
| 5,797,520 | A | | 8/1998 | Donahue | |
| 5,806,711 | A | | 9/1998 | Morano et al. | |
| 5,816,501 | A | | 10/1998 | LoPresti et al. | |
| 5,829,588 | A | | 11/1998 | Bloomfield | |
| 5,853,102 | A | | 12/1998 | Jarrett | |
| 6,019,294 | A | | 2/2000 | Anderson et al. | |
| 6,027,041 | A | | 2/2000 | Evans | |
| 6,053,429 | A | * | 4/2000 | Chang | 239/345 |
| 6,092,740 | A | * | 7/2000 | Liu | 239/346 |
| 6,196,410 | B1 | | 3/2001 | Hocking | |
| 6,257,429 | B1 | | 7/2001 | Kong | |
| 6,435,426 | B1 | * | 8/2002 | Copp, Jr. | 239/346 |
| 6,536,684 | B1 | | 3/2003 | Wei | |
| 6,536,687 | B1 | * | 3/2003 | Navis et al. | 239/345 |
| 6,588,681 | B2 | * | 7/2003 | Rothrum et al. | 239/328 |
| 6,595,441 | B2 | * | 7/2003 | Petrie et al. | 239/345 |
| 6,663,018 | B2 | * | 12/2003 | Rothrum et al. | 239/323 |
| 6,820,824 | B1 | * | 11/2004 | Joseph et al. | 239/346 |
| 7,143,960 | B2 | * | 12/2006 | Joseph et al. | 239/379 |
| 7,188,785 | B2 | * | 3/2007 | Joseph et al. | 239/302 |
| 2002/0134861 | A1 | * | 9/2002 | Petrie et al. | 239/345 |

FOREIGN PATENT DOCUMENTS

| | | | |
|---|---|---|---|
| CA | 1 192 852 | | 9/1985 |
| CA | 2099763 | | 7/1992 |
| CA | 2569369 | | 7/1998 |
| CH | 540 159 | | 9/1973 |
| CH | 688 082 | A5 | 5/1997 |
| DE | 29 00 998 | | 7/1980 |
| DE | 3439 442 | A1 | 4/1986 |
| DE | 88 07 118 | U | 9/1988 |
| DE | 41 02 326 | A1 | 7/1992 |
| DE | 42 09 258 | A1 | 9/1993 |
| DE | 196 18 514 | A1 | 11/1997 |
| DE | 299 05 100 | U1 | 6/1999 |
| DE | 201 17 496 | U1 | 2/2002 |
| EP | 0 636 548 | A1 | 7/1994 |
| EP | 0 678 334 | A2 | 10/1995 |
| EP | 0 689 825 | A1 | 1/1996 |
| EP | 0 987 060 | A1 | 3/2000 |
| FR | 2 639 324 | A1 | 5/1990 |
| FR | 2 798 868 | A1 | 3/2001 |
| GB | 2 103 173 | A | 2/1983 |
| GB | 2 170 471 | A | 8/1986 |
| JP | 64-27659 | | 1/1989 |
| JP | 6-335643 | | 12/1994 |
| JP | 8-192851 | A | 7/1996 |
| JP | 10-7170 | | 1/1998 |
| JP | 11-28394 | | 2/1999 |
| JP | 2001-252599 | A | 9/2001 |
| WO | WO 92/11930 | | 7/1992 |
| WO | WO 92/14437 | | 9/1992 |
| WO | WO 95/11170 | | 4/1995 |
| WO | WO 98/32539 | | 7/1998 |
| WO | WO 99/06301 | | 2/1999 |
| WO | WO 99/50153 | | 10/1999 |
| WO | WO 02/085533 | A1 | 10/2002 |

* cited by examiner

SPRAY GUN RESERVOIR WITH OVERSIZE, FAST-FILL OPENING

FIELD OF THE INVENTION

This invention concerns improvements in or relating to liquid supply assemblies for use with spraying apparatus such as a spray gun. More especially, the invention relates to liquid supply assemblies in which a reservoir containing the liquid to be sprayed is mounted on the spray gun.

BACKGROUND OF THE INVENTION

Spray guns are widely used to apply a liquid to a substrate in a variety of industries. In the known spray guns, the liquid is contained in a reservoir attached to the gun from where it is fed to a spray nozzle. On emerging from the spray nozzle, the liquid is atomised and forms a spray with compressed air supplied to the nozzle. The liquid may be gravity fed or suction fed or, more recently, pressure fed by an air bleed from the compressed air line to the reservoir or even from the spray gun itself.

A common application of spray guns is in vehicle body repair shops when re-spraying a vehicle that has been repaired following an accident. A typical paint finish may require application of a primer, base coat, top coat and a clear lacquer. Traditionally, the reservoir is a rigid pot detachably mounted on the spray gun by engagement of complementary screw threads on the spray gun and pot. The spray gun and pot have to be thoroughly cleaned when changing the liquid to be sprayed to avoid cross-contamination which may adversely affect the finish. This is especially important when spraying part of a vehicle to match exactly the colour of the existing colour of the adjacent bodywork. Cleaning the spray gun and pot is time consuming and often requires the use of solvents which are costly and may present a health hazard to the operator.

We have previously proposed in WO 98/32539 a reservoir in which the liquid is contained in a disposable lid/liner assembly. The liner is in the form of an open-topped container that is a close fit inside an outer rigid pot, and the lid is secured over the open end of the liner by a collar screwed onto the pot. The reservoir is releasably connected to the spray gun by means of a spout integral with the lid and through which liquid is withdrawn from the reservoir in use.

In this way, after spraying, the reservoir can be detached from the spray gun, the collar released and the lid/liner assembly removed from the outer pot and thrown away. The outer pot and collar can then be re-used with a new, clean liner and lid for supplying a different liquid to the spray gun. As a result, the amount of cleaning required is considerably reduced and the spray gun can be readily adapted to apply different liquids in a simple manner.

For some applications of the spray gun, a larger volume of liquid than the reservoir can hold may be required. For example, when painting a large area or applying several coats of the same liquid to the same or different vehicles such as when using a primer or lacquer finish. In this case, the reservoir can be detached from the gun, the collar released and the lid removed to allow liquid to be added to the liner. The reservoir is then re-assembled and re-attached to the spray gun.

Dis-assembly and re-assembly of the reservoir is time consuming and can result in spillage of liquid especially when the lid is removed from the liner. Also, removing the lid to add more liquid to the liner increases the risk of contamination from other sources, e.g. dust or dirt.

The alternative of adding liquid to the reservoir through the spout in the lid so as to avoid dis-assembly is slow due to the spout being of small size compatible with the connection to the spray gun so that liquid cannot be freely poured into the reservoir through the spout. Also the spout may contain a filter or a filter may be positioned in the lid across the inner end of the spout to remove any unwanted solid particles contained in the liquid withdrawn from the reservoir in use. Access to the filter requires dis-assembly of the reservoir and the presence of such filter further slows the addition of liquid to the reservoir through the spout.

Furthermore, if the liquid contains solid particles these will be trapped on the wrong side of the filter. As a result, when the reservoir is re-attached to the spray gun, the particles may be picked up with liquid withdrawn from the reservoir and pass to the spray gun. This may lead to a blockage within the spray gun. Alternatively or additionally, the particles may be applied with the liquid to the surface being sprayed with the result that the surface may have to be re-sprayed.

SUMMARY OF THE INVENTION

The present invention is intended to improve further our existing system and provide additional benefits and advantages for the user.

More specifically, at least one embodiment of the present invention provides a liquid supply assembly for use with a spray gun that allows liquid to be added in a simple manner.

Furthermore, at least one embodiment of the present invention provides a liquid supply assembly for use with a spray gun that can be supplied empty or pre-filled with liquid.

Moreover, at least one embodiment of the present invention provides a liquid supply assembly for use with a spray gun that can be thrown away after use to reduce the amount of cleaning required.

Other benefits and advantages of the invention are referred to later herein.

According to the present invention there is provided a liquid supply assembly for use with spraying apparatus such as a spray gun as defined in claim 1.

As used herein, the term "liquid" refers to all forms of flowable materials that can be applied to a surface using a spray gun (whether or not they are intended to colour the surface) including (without limitation) paints, primers, base coats, lacquers, varnishes and similar paint-like materials as well as other materials such as adhesives, sealers, fillers, putties, powder coatings, blasting powders, abrasive slurries, mould release agents and foundry. dressings which may be applied in atomised or non-atomised form depending on the properties and/or the intended application of the material and the term "liquid" is to be construed accordingly.

By this invention, the fluid outlet of the reservoir is provided by the spout of the separate cap member releasably secured to the reservoir. As a result, the opening in the reservoir can be oversize relative to the fluid outlet and the reservoir can be detached from the cap member to add liquid to the reservoir through the opening without dis-assembly of the reservoir. In this way, liquid can be added to the reservoir in a simple manner so that the risk of spillage and/or contamination of the liquid may be reduced.

This is of particular benefit if the capacity of the reservoir is less than the volume of liquid required for a particular application. For example, when spraying a large area, the user can detach the reservoir from the cap member to top-up the reservoir with additional liquid and re-attach the reservoir to the cap member.

It is also of benefit if it is desired to dilute the liquid being sprayed. For example, when applying a finishing clearcoat such as lacquer, the user can detach the reservoir from the cap member to add solvent to the reservoir to reduce the viscosity of the clearcoat for 'fading-out or blending' and re-attach the reservoir to the cap member.

The reservoir may be collapsible as liquid is withdrawn. For example, the side wall may be flexible in comparison to the end wall so as to be capable of deforming to collapse the reservoir in an axial direction from the second end towards the first end. Preferably, the end wall is comparatively rigid relative to the side wall to provide stability and allow the reservoir to be gripped by the user without collapsing when attaching the reservoir to and detaching the reservoir from the cap member. In a preferred arrangement, the reservoir is provided with a comparatively rigid base at the second end such that the reservoir can be inverted and stood on the base for adding liquid through the opening in the end wall.

The reservoir may be formed in one piece. For example, the reservoir may be a moulding such as a blow moulding. Alternatively, the base and side wall may be formed in one piece with the end wall being formed as a separate piece that is secured to the side wall. For example, the base and side wall may form an open topped container and the end wall may form a lid for the container. The lid may be permanently secured to the container. For example, the lid may be welded or adhesively bonded to the container. Alternatively, the lid may be releasably secured to the container. For example, the lid may be clamped to the container.

The cap member may be a screw-fit on the reservoir. Alternatively, the cap member may be releasably secured to the reservoir by any other suitable means, for example a snap-fit. In a preferred arrangement, the cap member comprises a base defining a socket with an internal screw thread to receive an externally threaded spigot bounding the opening in the reservoir and the spout extends from the base of the socket away from the reservoir.

The spout is of reduced size relative to the opening in the end wall of the reservoir for connection to the spray gun inlet. For example, the spout may have a diameter less than half the diameter of opening in the end wall of the reservoir, more preferably less than a third the diameter of the opening and more preferably less than a quarter the diameter of the opening. In one embodiment, the opening has a diameter of 50-60 mm, preferably 53 mm (about 2") and the spout has a diameter of 10-15 mm (about ½").

Preferably, the opening is located centrally in the end wall. In this way, the size of the opening can be maximised for rapid filling of the reservoir. Advantageously, the spout in the cap member is coaxial with the opening so that, when connected to the spray gun, the reservoir is aligned with the central longitudinal axis of the spray gun. As a result, balance, handling of the spray gun is not adversely affected by the weight of the reservoir and the liquid therein. Advantageously, the cap member is adapted for releasable connection to the spraying apparatus. For example, the cap member and spraying apparatus may be provided with co-operating bayonet type formations. In this way, the cap member can be connected to and released from the spraying apparatus with or without the reservoir being attached by a simple action requiring minimum effort or manual dexterity by the user.

Preferably, the spray gun is provided with a socket to receive the spout and the bayonet type formations are engageable to retain the spout in the socket. The socket may be an integral part of the spray gun or it may be a separate part secured to the spray gun. For example, the socket may be formed by an inlet adaptor secured to the spray gun.

In one arrangement, the bayonet type formations are engageable within the socket. For example, the spout may be provided with opposed bayonet lugs at the free end that are received in bayonet grooves in the socket. In another arrangement, the bayonet type formations are engageable externally of the socket. For example, the socket may have an external flange co-operable with a pair of hook members extending from the base of the cap member on opposite sides of the spout.

Preferably, the bayonet formations are engageable/disengageable with less than one complete turn of the cap member relative to the spray gun and the releasable connection between the cap member and the reservoir is arranged so that the reservoir is not disconnected from the cap member when connecting/disconnecting the cap member to/from the spray gun. For example, where the cap member is a screw fit on the reservoir, the screw threads may require more than one complete turn of the reservoir relative to the cap member to secure/release the reservoir to/from the cap member. Alternatively or additionally, the screw threads on the cap member and reservoir may be reversed so that the cap member is released from the reservoir by unscrewing in the opposite direction to that used to connect the cap member to the spray gun.

The cap member may include a filter for removing any unwanted solid particles contained in the liquid withdrawn from the reservoir. For example, the filter may be located in the spout. Alternatively, the filter may be seated at the base of the socket to extend across the opening to the spout. In this way, liquid can be added to the reservoir through the opening without filtering to remove any solid particles. Furthermore, if the filter becomes blocked in use, the cap member can be replaced.

Alternatively, liquid added to the reservoir may be filtered to remove any solid particulates so that filtering of the liquid withdrawn from the reservoir in use is not required. In this way, the filter in the cap may be omitted.

The reservoir may be supplied empty for the user to fill with liquid and attach the cap member to connect the reservoir to the spray gun. Where the reservoir is collapsible, it may be collapsed to a compact form for storage and transportation.

Alternatively, the reservoir may be supplied pre-filled with liquid and the opening sealed until it is desired to use the liquid. For example, the opening may be sealed using a removable closure or a rupturable membrane that is broken when the cap member is attached to the reservoir. In another arrangement, the cap member may be adapted to seal the opening until it is desired to use the liquid. For example, the cap member may be provided with a removable seal at the base of the socket to close the spout. Alternatively, a rupturable membrane may be provided across the end of the spout that is broken when the spout is attached to the spray gun.

Pre-filling may be employed for liquids that can be packaged and stored until required without degrading. Thus, pre-filling may be especially useful for liquids that can be supplied ready to use (i.e. without requiring modification to match the colour to an existing colour). For example, base coats in standard colours of a specified shade and/or primers or lacquers that can be supplied in a non-activated form and activated (if necessary) by suitable means such as by exposure to a source of light (ultraviolet) or electrical energy when required. Whichever arrangement is employed, the reservoir can be re-filled in use by detaching the reservoir from the cap member, adding liquid through the opening and re-attaching the reservoir to the cap member.

In a preferred arrangement, the cap member has a base and a spout, the cap member being releasably secured to the reservoir by engagement of complementary screw threads on the base and on the end wall around the opening, and the spout extends from the base away from the reservoir to provide a fluid outlet of reduced cross-section relative to the opening.

Preferably, the reservoir is collapsible as liquid is withdrawn in use. For example, the end wall may be comparatively rigid compared to the side wall. In this way, the end wall provides stability and allows the reservoir to be gripped without collapsing when attaching the reservoir to and detaching the reservoir from the cap member, and the side wall is collapsible in an axial direction towards the end wall as liquid is withdrawn from the reservoir in use.

In one arrangement, the cap member has a socket provided with an internal screw thread engageable with an external screw thread on a spigot extending around the opening in the end wall. In another arrangement, the marginal edge of the opening has an internal screw thread engageable with an external screw thread on the cap member.

In another preferred arrangement, the opening is oversize relative to the flow requirements when the reservoir is connected to the spray gun in use, and the fluid outlet provided by the spout is of reduced cross-section relative to the opening, wherein the opening permits fast-filling of the reservoir when the cap member is detached from the reservoir for adding fluid to the reservoir through the opening.

By providing the reservoir with an oversize, fast-fill opening, the addition of liquid to the reservoir is facilitated in a simple manner that reduces the risk of spillage.

The invention will now be described in more detail, by way of example only, with reference to the accompanying drawings, wherein:

DETAILED DESCRIPTION OF THE PREFERRED EMBODIMENTS

Figure 1:
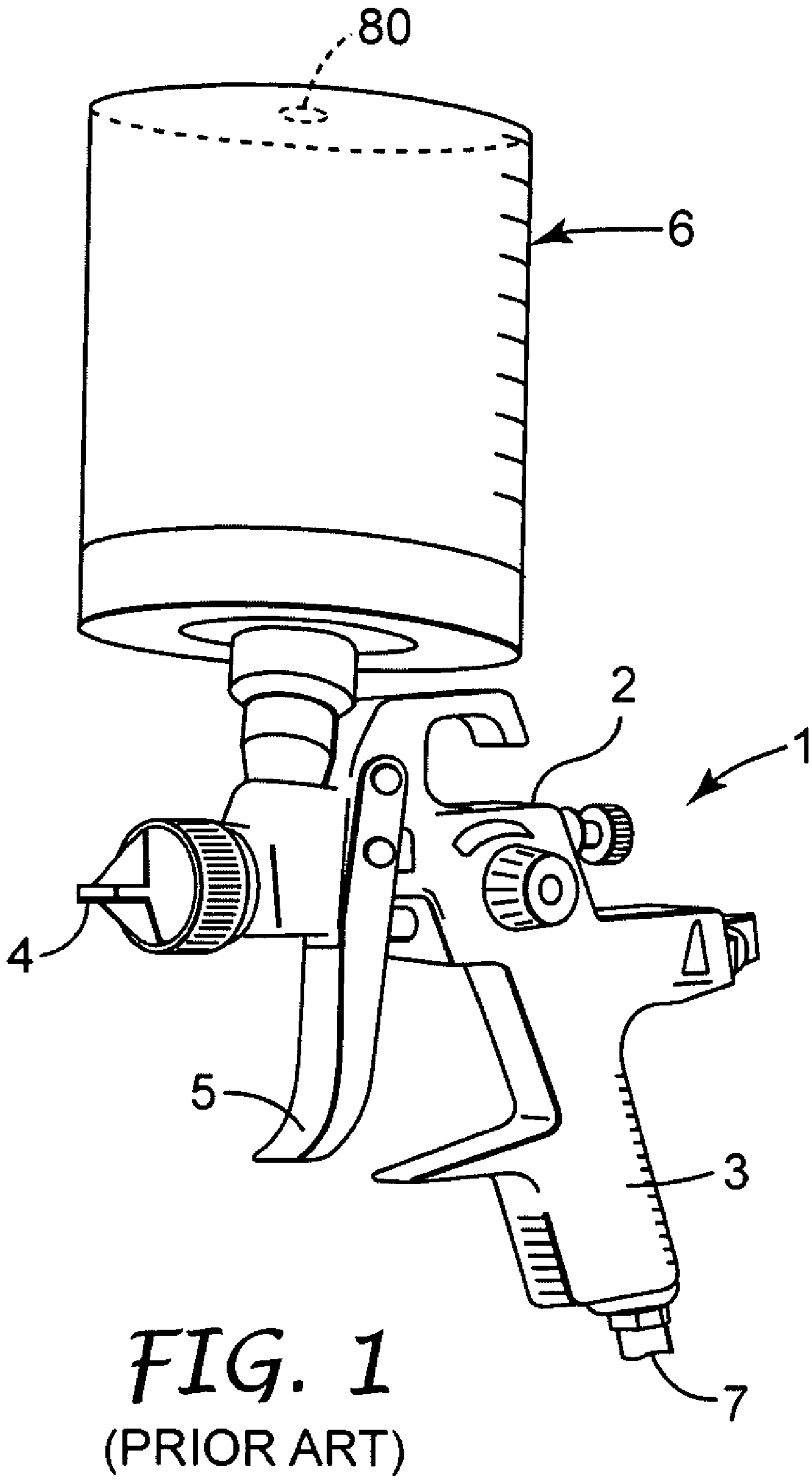
FIG. 1 (PRIOR ART)
FIG. 1 is a perspective view of a prior art spray gun.

FIG. 1 of the drawings illustrates a prior art paint spray gun 1 of the gravity-feed type disclosed in our co-pending patent application published under No: WO 98/32539 the contents of which are incorporated herein by reference.

The gun 1 comprises a body 2, a handle 3 which extends downwards from the rear end of the body, and a spray nozzle 4 at the front end of the body. The gun 1 is manually-operated by a trigger 5 which is pivotally-mounted on the sides of the gun.

A paint pot 6, which contains paint (or similar material) to be discharged by the gun, is located on the top of the body 2 and communicates with an internal passageway (not visible) which extends through the gun to the nozzle 4.

In use, the gun 1 is connected via a connector 7 at the lower end of the handle 3 to a source of compressed air (not shown) so that, when the user pulls on the trigger 5, compressed air is delivered through the gun to the nozzle 4. As a result, paint delivered under gravity from the pot 6 to the nozzle 4 is atomised on leaving the nozzle 4 and forms a spray with the compressed air emerging from the nozzle 4.

Figure 2:
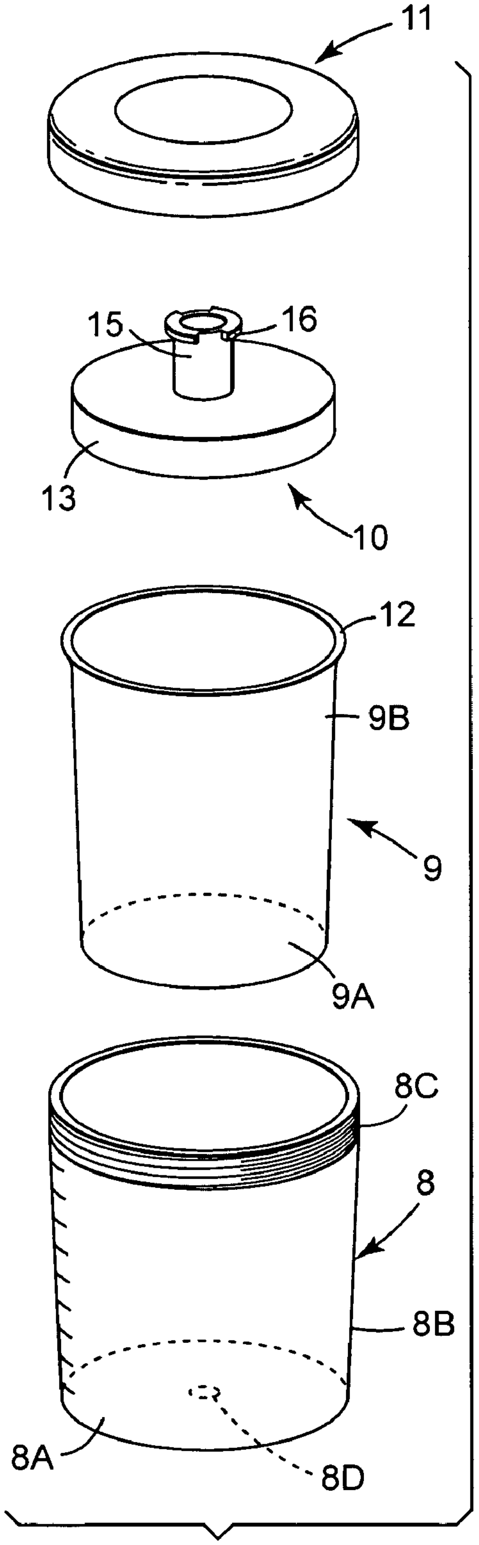
FIG. 2 is an exploded isometric view of the component parts of the paint reservoir shown in FIG. 1.
Figure 3:
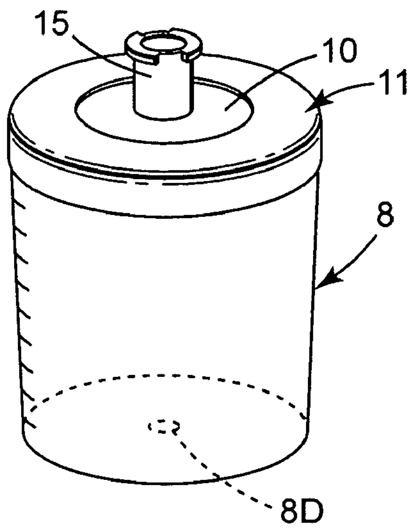
FIG. 3 (PRIOR ART)
FIG. 3 is a perspective view of the assembled paint reservoir shown in FIG. 2.
Figure 4:
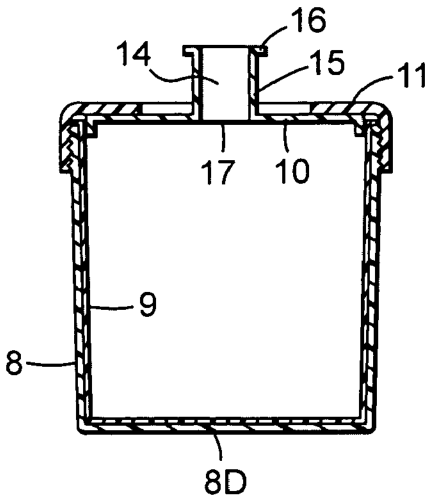
FIG. 4 (PRIOR ART)
FIG. 4 is a longitudinal section through the paint reservoir shown in FIG. 3.

Referring now to FIGS. 2 to 4 of the drawings, the paint pot 6 includes an outer container 8, a disposable liner 9, a disposable lid 10 and a collar 11. The liner 9 corresponds in shape to (and is a close fit in) the interior of the container 8 and has a narrow rim 12 at the open end which sits on the top edge of the container 8.

The lid 10 has a dependent skirt 13 at the peripheral edge which is a push-fit in the open end of the liner 9 and a central aperture 14 from which extends a spout 15 forming a fluid outlet. The spout 15 is provided at its free end with outward extensions 16 forming one part of a bayonet connection. The aperture 14 is covered at the inner end of the spout 15 by a filter mesh 17 which may be a push fit in the skirt 13 or may be an integral part of the lid 10. Alternatively, the filter may be a push fit in the spout 15.

The lid 10 is held firmly in place on the container 8 by the annular collar 11 which screws onto the container 8 on top of the lid 10. In the assembled condition, the liner 9 and lid 10 form a reservoir for containing the paint or other liquid to be delivered to the nozzle 4 via the spout 15.

Figure 6:
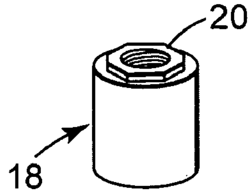
FIG. 6 (PRIOR ART)
FIG. 6 is a perspective view of an adapter for connecting the paint reservoir to the spray gun.
Figure 7:
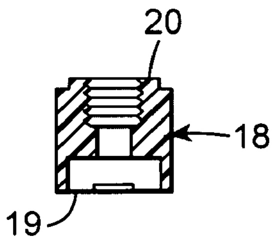
FIG. 7 (PRIOR ART)
FIG. 7 is a longitudinal section through the adapter shown in FIG. 6.
Figure 8:
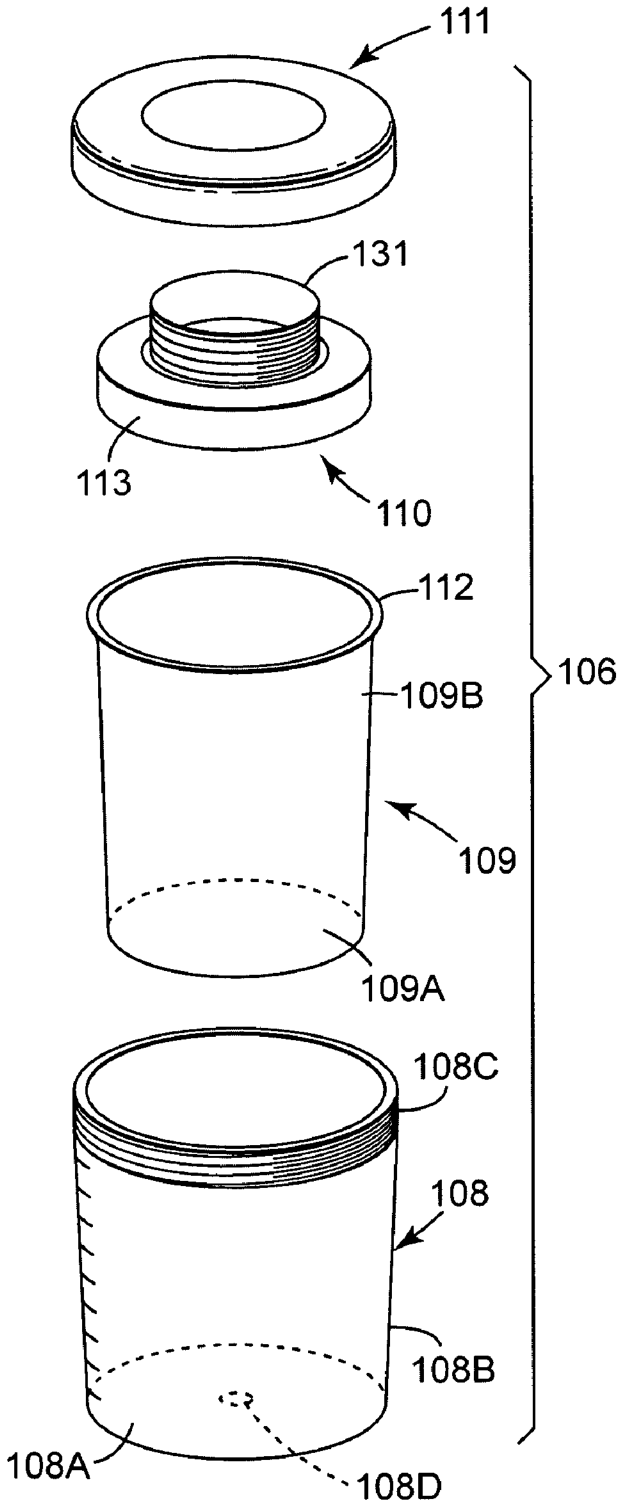
FIG. 8 is an exploded isometric view similar to FIG. 2 showing the component parts of a paint reservoir according to a first embodiment of the invention.
Figure 9:
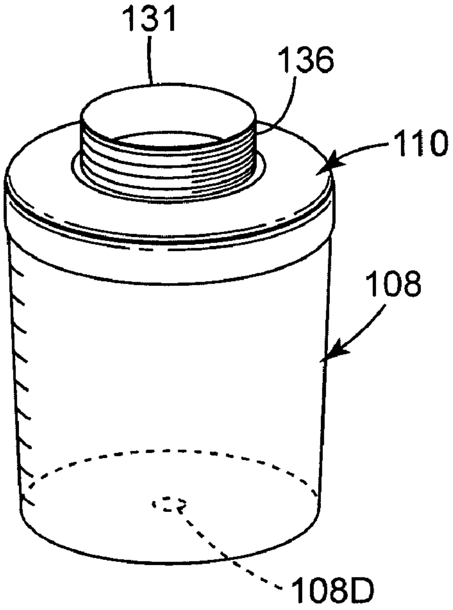
FIG. 9 is a perspective view similar to FIG. 3 showing the assembled paint reservoir of FIG. 8.

The paint pot 6 is attached to the spray gun 1 through use of an adapter 18 shown separated from the paint pot 6 in FIGS. 6 and 7. The adapter 18 is a tubular component which is formed internally at one end with a socket 19 having the other part of the bayonet connection for attachment to the spout 15 of the lid 10. At the other end 20, the adapter 18 is shaped to match the standard attachment of the spray gun paint pot (typically a screw thread).

The container 8 of the paint pot 6 is formed from a plastic material, for example polyethylene or polypropylene, and may be translucent (as shown in FIG. 2) or opaque, and of any suitable size. For use with a paint spray gun, containers 8 having a capacity of 250, 500 or 800 ml could typically be used, although other sizes could be used if required.

In this embodiment, the container 8 is of generally cylindrical shape closed at one end 8A. The other end is open and side wall 8B is formed with an external screw thread 8C. Base 8A is flat so that the container 8 can stand unsupported on a flat surface and is formed with a central air hole 8D. Internally, the side wall 8B tapers inwardly slightly from the open end to the base 8A.

The liner 9 is preferably transparent and is thermo-formed from a single piece of plastics material, preferably polyethylene or polypropylene. The shape of the liner 9 is dictated by and matches the internal shape of the container 8. The liner 9, like the inside of the container 8, is of generally cylindrical shape closed at one end 9A and side wall 9B tapers inwardly slightly from the mouth towards the closed end 9A.

The base or closed end 9A is comparatively rigid but the side walls 9B are flexible and can be made to collapse. Nevertheless, the liner 9 is capable of standing, unsupported, on the base 9A with side walls 9B extended and upright as shown in FIGS. 2 to 4.

Figure 5:
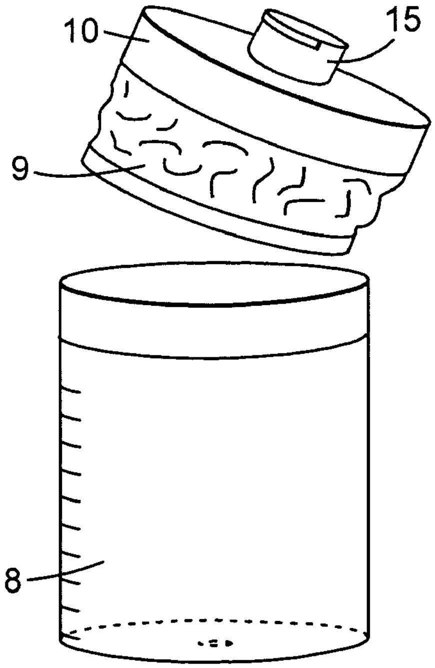
FIG. 5 (PRIOR ART)
FIG. 5 shows separation of the component parts of the paint reservoir of FIG. 3 after use.

When the liner 9 collapses, the comparatively rigid base 9A retains its form but moves towards the rim portion 12 as a consequence of the collapse of the side walls 9B, as illustrated in FIG. 5. The side walls 9B collapse in a similar fashion to a plastic bag without being ruptured (e.g. by splitting, tearing or cracking).

The lid 10 is also formed from a plastic material, for example, polyethylene or polypropylene, and may be formed by an injection moulding process. The lid 10 may be translucent or opaque and may be coloured. The collar 11 may be a moulded plastic component, or it may be a machined metal (for example, aluminium) component. The adapter 18 may be a metal or plastic component and may, for example, be formed from aluminium and anodised or plated.

To use the paint pot 6, the adapter 18 is attached at the end 20 to the spray gun and is left in position. Then, with the paint pot 6 disassembled as shown in FIG. 2, the liner 9 is pushed inside the container 8. Paint is then put into the liner 9 and, if necessary, mixed with other tinters, hardeners and thinners (solvents). The lid 10 is then pushed into place and the collar 11 is screwed down tightly to hold the lid 10 in position.

The top portion of the liner 9 is then trapped between the skirt 13 of the lid 10 and the sidewall 8B of the container 8, and the rim 12 of the liner 9 is trapped between the top edge of the container 8 and the collar 11 as shown in FIG. 4. The spray gun 1 is then inverted from its normal operating position illustrated in FIG. 1 so that the end of the spout 15 can be attached to the adapter 18 after which the spray gun 1 can be returned to its normal operating position for use in the usual way.

As paint is removed from within the liner 9, the sides 9B of the liner 9 collapse as a result of the decreased pressure within the liner 9. The base 9A of the liner 9, being more rigid, retains its shape so that the liner 9 tends to collapse in the longitudinal rather than the transverse direction thereby reducing the possibility of pockets of paint being trapped in the liner 9.

The user can choose to evacuate the air from within the liner 9 before operating the spray gun 1 although that is not essential. It does, however, increase the range of angles at which the spray gun 1 will function satisfactorily since there is no risk of air entering the spray gun 1 from the paint pot 6. To evacuate the air from within the liner 9, the trigger 5 of the spray gun 1 should be actuated while the spray gun 1 is still in the inverted position.

After use, when the spray gun 1 is to be cleaned, the spray gun 1 can be re-inverted from its operating position shown in FIG. 1, the airline disconnected and the trigger 5 actuated briefly to allow paint within the spray gun 1 to drain back into the liner 9 in the pot 6. The pot 6 is then removed from the spray gun 1 by detaching the spout 15 from the adapter 18 which remains on the spray gun 1.

The collar 11 is removed from the container 8, and the lid 10 is then pulled out, bringing with it the collapsed liner 9 as shown in FIG. 5. The lid 10 (including the filter 17) and liner 9 are discarded, leaving the container 8 and collar 11 clean and ready for re-use with a fresh liner 9 and lid 10. Only the spray gun 1 itself needs to be cleaned, resulting in a substantial reduction in the amount of solvent used.

The risk of unused paint spilling from the pot 6 is also substantially reduced because the liner 9 is removed and discarded in a somewhat collapsed condition with the lid 10 in place. Moreover, because the liner 9 is discarded in a collapsed condition, the amount of space required for collection of used liners 9 is minimised.

As will be apparent from the foregoing description, the arrangement of the disposable liner 9 and lid 10 forming a reservoir to contain the paint or other liquid to be sprayed considerably reduces the amount of cleaning required when changing the liquid to be sprayed or when putting the spray gun 1 away at the end of the working day.

It can happen, however, that the area to be painted requires a larger volume of paint than the reservoir can hold. In these circumstances, the user has to remove the pot 6 from the spray gun 1, release the collar 11 and remove the lid 10 to allow the reservoir to be topped up. The lid 10 then has to be relocated on the open end of the liner 9, the collar 11 refitted and the pot 6 reattached to the spray gun 1 to enable the user to continue spraying. This is time consuming and there is a risk of paint being spilt and/or contaminated when the lid 10 is removed.

Some users may try to re-fill the reservoir through the spout 15, but this is even slower with increased risk of spillage due to the small size of the spout 15 and the presence of the filter 17. Also, any solid particles trapped by the filter 17 when re-filling through the spout 15 are on the wrong side of the filter 17 when the reservoir is re-attached to the spray gun 1. As a result, these particles are entrained in the liquid delivered to the spray gun and this may lead to blockage within the spray gun or re-working of any surface finish contaminated with the particles.

In order to avoid these problems, some users fill two or more reservoirs with the same liquid that can be fitted to the spray gun in turn when spraying large areas. This enables the user to change over the reservoirs and continue spraying with the same liquid. However, filling and assembling several reservoirs is time consuming and adds to operating costs. Thus, each reservoir has a disposable liner and lid which is discarded after spraying and use of several reservoirs for the same liquid is wasteful of such disposable items and requires the user to have available a sufficient number of pots and collars for assembly of the reservoirs.

Referring now to FIGS. 8 to 12 of the drawings, there is shown a first embodiment of the present invention which enables the user to add paint to the reservoir without disassembly of the reservoir. For convenience, like reference numerals in the series 100 are used throughout to indicate parts corresponding to FIGS. 1 to 7 and the construction and operation of similar parts will be understood from the description above and will not be further described in detail.

As shown the paint pot 106 includes an outer container 108, a disposable liner 109, a disposable lid 110 and a collar 111 that are assembled in similar manner to the previous embodiment. In accordance with the present invention, the lid 110 has a central opening 130 bounded by an external tubular spigot 131 and a separate cap member 132 is provided for connecting the pot 106 to a spray gun (not shown). By locating the opening 130 centrally, the size of the opening 130 can be maximised for a given available space.

The cap member 132 comprises a base 133 having a socket 134 with an internal screw thread 135 engageable with a complementary external screw thread 136 on the spigot 131 to secure releasably the cap member 132 to the lid 110 in a fluid-tight manner. It will be understood that additional sealing means may be provided to prevent leakage if required. For example the outer end of the spigot 131 may engage an 0-ring (not shown) located within the cap member 132.

The cap member 132 also has a spout 115 extending from the base 133 and providing a fluid outlet for connection to a fluid inlet on the spray gun 101 via an inlet adaptor (not shown) releasably secured to the spray gun. In this embodiment, the cap member 132 is releasably secured to the inlet adaptor by engagement of bayonet formations 116 on the spout 115 with complementary bayonet formations (not shown) on the inlet adaptor.

The bayonet formations require less than one complete turn of the cap member 132 relative to the inlet adaptor to secure/release the reservoir whereas the screw threads on the cap member 132 and spigot 131 require more than one complete turn of the cap member 132 relative to the reservoir to connect/disconnect the reservoir. In this way, accidental or unintentional release of the reservoir from the cap member 132 is prevented when attaching/detaching the cap member 132 to/from the spray gun.

Figure 10:
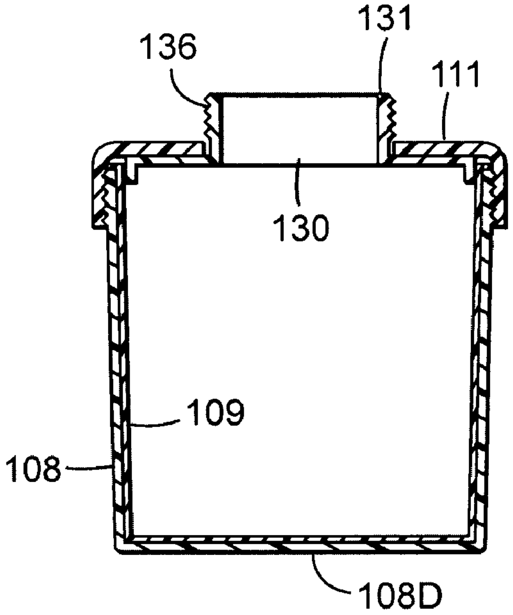
FIG. 10 is a longitudinal section through the paint reservoir of FIG. 9.
Figure 11:
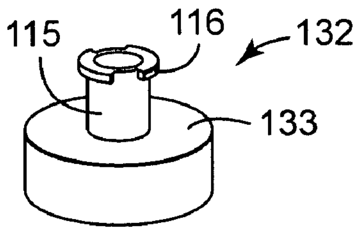
FIG. 11 is a perspective view of a cap member for use with the reservoir of FIGS. 8 to 10.
Figure 12:
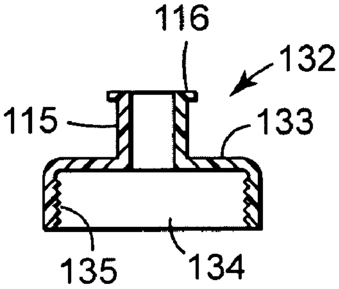
FIG. 12 is a longitudinal section showing the cap member of FIG. 11 attached to the reservoir of FIGS. 8 to 10.

As can be seen from FIGS. 10 and 12, the internal diameter of the spout 115 is considerably smaller than the diameter of the central opening 130 in the lid 110 of the reservoir. For example, in this embodiment, the spout 115 has an internal diameter of 10-15 mm (approximately ½") and the central opening 130 has an internal diameter of 53 mm (approximately 2"). The spout 115 is coaxial with the central opening 130 so that, when connected to the spray gun, the reservoir is aligned with the central longitudinal axis of the spray gun. As a result, the weight of the reservoir and the liquid therein is evenly distributed so that balance, handling of the spray gun is not adversely affected.

The opening 130 is oversize relative to the required flow when the reservoir is connected to the spray gun and permits fast-filling of the reservoir with liquid added through the opening 130 when the pot 106 is disconnected from the cap member 132. As a result, if it is desired to top-up the reservoir in use, the pot 106 can be detached from the cap member 132 by unscrewing the connection between the spigot 131 and the cap member 132 to provide access to the opening 130. Liquid can then be added to the reservoir through the opening 130 and the pot 106 re-connected to the cap member 132 on the spray gun 101.

In this way, fast filling of the reservoir is possible by pouring liquid freely into the reservoir through the oversize central opening 130. In this way, addition of liquid to the reservoir can be carried out relatively easily without dis-assembly of the pot 106 and with reduced risk of spillage or contamination of the liquid. As will be appreciated, the central opening 130 may be used to add liquid to the reservoir either when topping up the reservoir in use or when first filling the reservoir prior to commencing spraying.

The opening 130 may also allow insertion of a tool to stir the contents of the reservoir allowing mixing to be carried out in the reservoir after the pot 106 has been assembled to secure the lid 110 to the liner 109. In this way, the risk of spillage is further reduced.

A filter (not shown) may be provided in the cap member 132 to remove any contaminants such as solid particles in the liquid. For example, a filter may be positioned in the spout 115 or in the socket 134 so as to extend across the inner end of the spout 115 when the lid 110 is connected to the cap member 132. In this way, if the filter becomes blocked in use, the cap member 132 may be replaced.

Alternatively, a removable filter (not shown) may be located in the central opening 130 when adding liquid to the reservoir. The filter may be of any type and preferably has a large surface area so that the addition of liquid to the reservoir is not significantly reduced. In this way, provision of a filter in the cap member 132 may be dispensed with thereby reducing the risk of interruption or reduction in the flow of liquid to the spray gun due to blockage of the filter in use.

Figure 13:
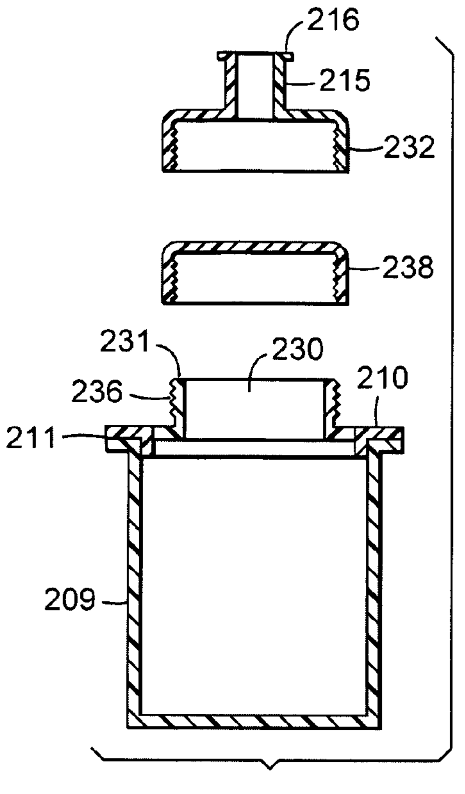
FIG. 13 is a perspective view of a reservoir and cap member according to a second embodiment of the present invention.

Referring now to FIG. 13, there is shown a second embodiment of the present invention in which like reference numerals in the series 200 are used to indicate parts corresponding to the previous embodiments and the construction and operation of similar parts will be readily understood from the description already given and will not be further described in detail.

In this second embodiment, the liner 209 and lid 210 are permanently joined together. For example, the liner 209 and lid 210 may be formed integrally in one piece by blow moulding. Alternatively, the liner 209 and lid 210 may be formed separately by moulding and connected together by welding, adhesive or other suitable means 211 of forming a permanent join therebetween.

The reservoir formed by permanently joining the liner 209 and lid 210 may be used without the outer container and collar of the previous embodiments. Alternatively, some form of external support for the liner 209 may be provided to protect the liner 209 and to improve stability when adding liquid to the reservoir and in use when the reservoir is connected to a spray gun (not shown). The support (not shown) may comprise an outer container and collar as described previously. Alternatively, the lid 210 may be formed with an external flange (not shown) or similar formation onto which a support sleeve or cage may be releasably secured to surround the liner 209.

The reservoir may be supplied empty for the user to fill through the central opening 230 in the lid 210 prior to connecting the reservoir to the spray gun. Alternatively, the reservoir may be supplied pre-filled with liquid and the central opening 230 in the lid 210 sealed by a removable closure (not shown) such as a screw cap 238 or a rupturable membrane such as a foil strip. Where provided, the rupturable membrane may be broken when the cap member 232 is attached to the reservoir.

Pre-filling may be advantageous for liquids that can be stored without degrading and/or which do not require accurate colour matching such as primer paints or clearcoat lacquers. It may also be possible to store temporarily any unused liquid on removal of the reservoir from the spray gun by re-sealing the opening 230 in the lid 210 with the screw cap 238 (where provided) or any other suitable closure. This may allow the liquid to be used later by re-attaching the reservoir to the spray gun and is of potential benefit for liquids that do not cure and harden within a relatively short period of time after first use. The reservoir may be collapsed to remove any air prior to attaching the screw cap 238. In this way, the life of the stored liquid may be extended.

Figure 14:
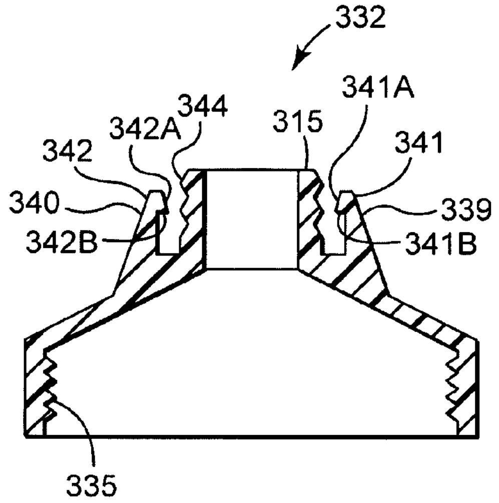
FIG. 14 is a perspective view of alternative cap member for use with the reservoir of FIGS. 8 to 10 or FIG. 13.
Figure 15:
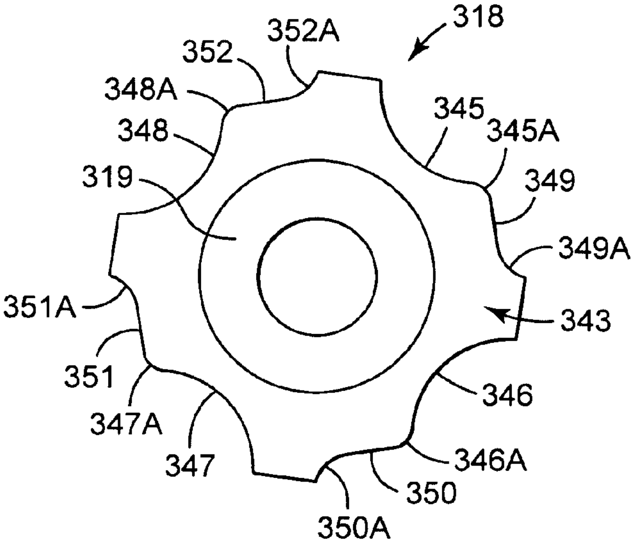
FIG. 15 is a plan view of an alternative adaptor for use with the cap member of FIG. 14 to connect the reservoir to the spray gun

Referring now to FIGS. 14 and 15, there is shown an alternative cap member and inlet adaptor for use with the reservoir of the present invention. For convenience, like reference numerals in the series 300 are used to indicate parts corresponding to the previous embodiments and the construction and operation of similar parts will be readily understood from the description already given and will not be further described in detail.

In this third embodiment, the cap member 332 for connecting the reservoir (not shown) to the spray gun (not shown) is provided with releasable connector means separate from the spout 315. The connector means comprises a pair of hook members 339, 340 arranged on opposite sides and spaced from the spout 315. Each hook member 339, 340 is similar and has an enlarged head 341, 342 respectively with a chamfer face 341*a*, 342*a* terminating at an undercut rib 341*b*, 342*b*.

The inlet adaptor 318 on the spray gun has an external flange 343 at the outer end for co-operating with the hook members 339, 340 to secure releasably the reservoir to the spray gun with the spout 315 received in the socket 319. In this embodiment; the spout 315 has external annular ribs 344 that provide a fluid-tight seal within the socket 319. It will be understood, however, that any suitable sealing means may be provided such as one or more O-rings in the socket 319 and/or on the spout 315.

As best shown in FIG. 15, the flange 343 comprises four arcuate recesses 345, 346, 347, 348 uniformly spaced in a circumferential direction around the outer periphery such that the recesses 345, 347 are opposite each other and the recesses 346, 348 are opposite each other.

Each recess 345, 346, 347, 348 leads in a clockwise direction (as viewed in FIG. 15) via a cam lobe 345*a*, 346*a*, 347*a*, 348*a* at the end of the recess 345, 346, 347, 348 to a flat 349, 350, 351, 352 that terminates in an abutment 349*a*, 350*a*, 351*a*, 352*a*.

In use, to secure the cap member 332 to the inlet adaptor 318, the hook members 338, 339 are aligned with a pair of opposed recesses 345, 347 or 346, 348 in the flange 343. The spout 315 is then pushed into the socket 319 so that the enlarged heads 341, 342 at the distal ends of the hook members 339, 340 pass through the aligned recesses 345, 347 or 346, 348.

The cap member 332 is then rotated relative to the inlet adaptor 318 to cause the hook members 339, 340 to ride over the cam lobes 345*a*, 347*a* or 346*a*, 348*a* and locate locking ribs 341*b*, 342*b* of the heads 341, 342 behind the flat's 349, 351 or 350, 352. In this way, the cap member 332 is secured to the inlet adaptor 318 and axial separation of the cap member 332 from the inlet adaptor 318 is resisted. The cap member 332 can be detached from the inlet adaptor 318 by reversing the above operation.

As shown in FIG. 14, the cap member 332 may be secured to a reservoir by engagement of the internal screw thread 335 of the socket in the base of the cap member 332 with the external screw thread 335 on the spigot 331 surrounding the central opening 330 in the lid 310 of the reservoir. The lid 310 and liner 309 may be releasably secured together as shown in FIGS. 8 to 12 or permanently connected as shown in FIG. 13.

Figure 16:
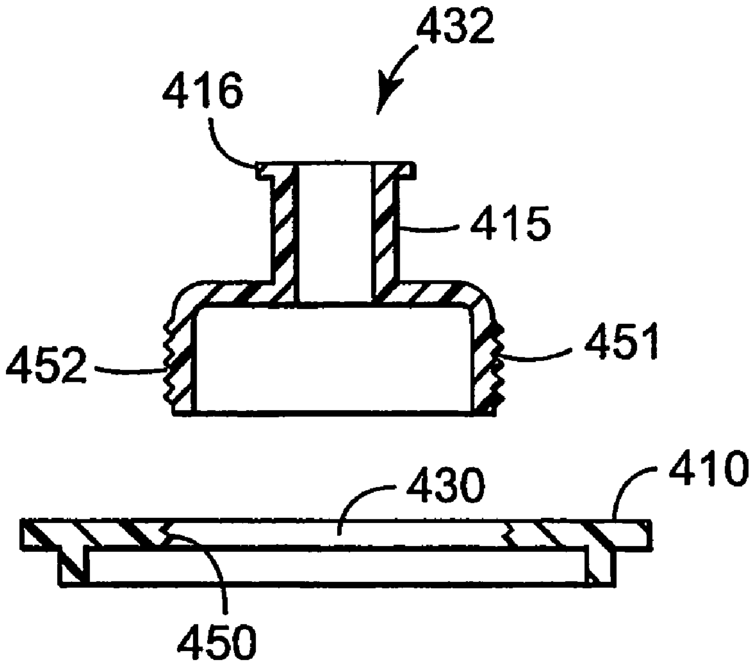
FIG. 16 is a longitudinal section similar to FIG. 12 showing an alternative connection between the cap member and reservoir.
Figure 17:
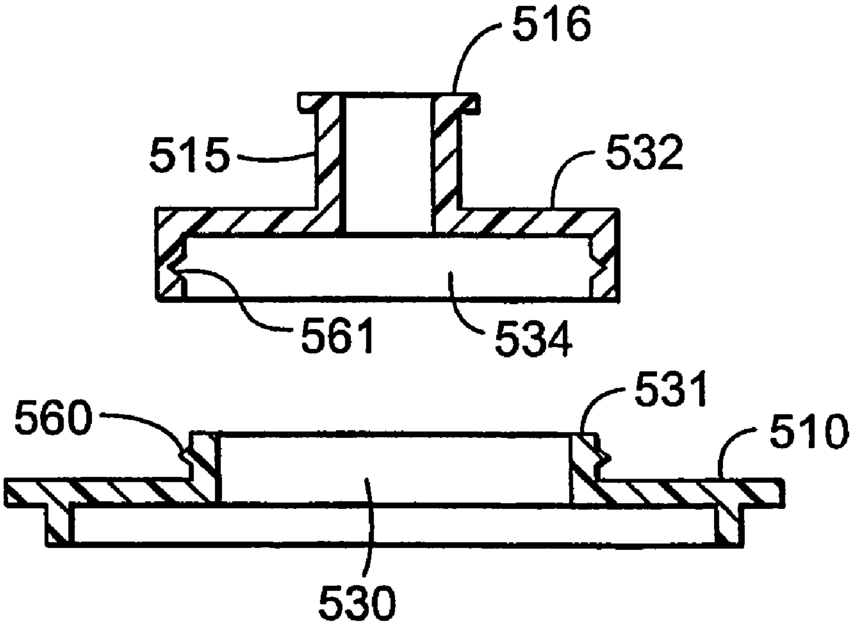
FIG. 17 is a longitudinal section similar to FIG. 12 showing a further alternative connection between the cap member and reservoir.

Referring now to FIGS. 16 and 17, two alternative arrangements for releasably securing the cap member to the reservoir are shown for convenience, like reference numerals in the series 400 and 500 are used to indicate parts corresponding to the previous embodiments.

As shown in FIG. 16, the opening 430 in the lid 410 is provided with an internal screw thread 450 and the base of the cap member 432 has a spigot 451 with an external screw thread 452 that is engageable with the screw thread 450 to secure releasably the cap member 432 to the reservoir.

In FIG. 17, the lid 510 and cap member 532 are provided with complementary formations engageable with a snap action to secure releasably the cap member 532 to the reservoir around the opening 530. In this embodiment, the complementary formations comprise an external rib 560 on spigot 531 and an internal groove 561 in socket 534. It will be understood, however that any suitable formations may be employed.

Other arrangements for releasably securing the cap member to the reservoir will be apparent to those skilled in the art.

As will now be appreciated, the present invention provides liquid supply apparatus for use with a spray gun including a reservoir having an oversize, fast-fill central opening and a separate cap member connectable to the reservoir with a spout providing a fluid outlet for connection to the spray gun. In this way, the reservoir can be detached from the cap member allowing liquid to be added to the reservoir through the central opening in a simple manner with reduced risk of spillage. Furthermore, by locating the opening centrally of the available space, the size of the opening can be maximised. Moreover, by arranging the outlet of the cap member coaxial with the opening, the reservoir is aligned with the central longitudinal axis of the spray gun so that balance, handling of the spray gun is not adversely affected.

It will also be appreciated that the exemplary embodiments described herein are intended to illustrate the diverse range and application of the invention and that features of the embodiments may be employed separately or in combination with any other features of the same or different embodiments.

Moreover, while the exemplary embodiments described and illustrated are believed to represent the best means currently known to the applicant, it will be understood that the invention is not limited thereto and that various modifications and improvements can be made within the scope of the claims hereinafter.

The invention claimed is:

1. A liquid supply assembly for use with a gravity-fed spray gun comprising:

a reservoir for a liquid to be sprayed, the reservoir comprising:

a liner having a first end, a second end spaced from the first end, a side wall extending from the first end to the second end, a base at the second end, and an opening defined by the first end, wherein the liner is able to stand on its own, unsupported; a lid configured to fit within the opening in the liner, the lid having a central opening; a cap member positioned over the lid, the cap member having a spout providing a fluid outlet communicating with the liner, wherein the spout is connectable to a spray gun and wherein the opening in the lid is oversize relative to the spout; and an outer container for supporting the liner wherein the cap member is releasably secured to the reservoir and a marginal edge of the opening in the lid is spaced inwardly from the side wall at the first end of the liner, and the reservoir can be detached from the cap member for adding fluid to the reservoir through the opening in the lid.

2. The assembly of claim 1 wherein the liner is collapsible as liquid is withdrawn.

3. The assembly of claim 2 wherein the side wall of the liner is flexible in comparison to the base so as to be capable of deforming to collapse the liner in an axial direction from the second end towards the first end.

4. The assembly of claim 3 wherein the liner is provided with a comparatively-rigid base at the second end such that the liner can be inverted and stood on the base for adding liquid through the opening in the liner.

5. The assembly of claim 4 wherein the liner is formed in one piece.

6. The assembly of claim 4 wherein the base and side wall are formed in one piece with the lid being formed as a separate piece that is secured to the side wall.

7. The assembly of claim 6 wherein the lid is permanently secured to the liner.

8. The assembly of claim 7 wherein the lid is welded or adhesively bonded to the liner.

9. The assembly of claim 6 wherein the lid is releasably secured to the liner.

10. The assembly of claim 9 wherein the lid is clamped to the liner.

11. The assembly of claim 1 wherein the cap member is a screw-fit on the reservoir.

12. The assembly of claim 1 wherein the cap member is a snap-fit on the reservoir.

13. The assembly of claim 11 wherein the cap member comprises a base defining a socket with an internal screw thread engageable with an externally threaded spigot bounding the opening in the reservoir.

14. The assembly of claim 11 wherein the opening in the reservoir has an internal screw thread and the cap member has a base provided with an externally threaded portion engageable with the internal screw thread.

15. The assembly of claim 1 wherein the spout has a diameter less than half the diameter of opening in the lid.

16. The assembly of claim 15 wherein the spout has a diameter less than a third the diameter of the opening in the lid.

17. The assembly of claim 16 wherein the spout has a diameter less than a quarter the diameter of the opening in the lid.

18. The assembly of claim 17 wherein the opening in the lid has a diameter of 50-60 mm and the spout has a diameter of 10-15 mm.

19. The assembly of claim 1 wherein the reservoir has a central longitudinal axis and the opening is located centrally on the longitudinal axis.

20. The assembly of claim 19 wherein the spout is coaxial with the opening.

21. The assembly of claim 1 wherein the cap member is releasably connectable to the spraying apparatus.

22. The assembly of claim 21 wherein the cap member and spraying apparatus are provided with co-operating bayonet type formations.

23. The assembly of claim 22 wherein the spraying apparatus is provided with a socket to receive the spout and the bayonet type formations are engageable to retain the spout in the socket.

24. The assembly of claim 23 wherein the bayonet type formations are engageable within the socket.

25. The assembly of claim 24 wherein the spout is provided with opposed bayonet lugs at the free end that are received in bayonet grooves in the socket.

26. The assembly of claim 23 wherein the bayonet type formations are engageable externally of the socket.

27. The assembly of claim 26 wherein the socket has an external flange co-operable with a pair of hook members extending from the cap member on opposite sides of the spout.

28. The assembly of claim 1 wherein the cap member includes a filter for removing any unwanted solid particles contained in the liquid withdrawn from the reservoir.

29. The assembly of claim 28 wherein the filter is located in the spout.

30. The assembly of claim 28 wherein the filter is located in the cap member to extend across the inner end of the spout.

31. The assembly of claim 1 wherein the opening is sealed.

32. The assembly of claim 31 wherein the opening is sealed using a removable closure or a rupturable membrane.

33. The assembly of claim 32 wherein the cap member is adapted to rupture the membrane.

34. The assembly of claim 31 wherein the cap member is adapted to seal the opening until it is desired to use the liquid.

35. The assembly of claim 34 wherein the cap member is provided with a removable element to close the spout.

36. The assembly of claim 34 wherein a rupturable membrane is provided across the outer end of the spout.

37. The assembly of claim 36 wherein the spraying apparatus is adapted to rupture the membrane.

38. The assembly of claim 1 wherein the cap member has a base and a spout, the cap member being releasably secured to the reservoir by engagement of complementary screw threads on the base and on the end wall around the opening, and the spout extends from the base away from the reservoir, the spout providing a fluid outlet of reduced cross-section relative to the opening.

39. The assembly of claim 38 wherein the reservoir has a central longitudinal axis and the opening and spout are arranged coaxially with respect to the longitudinal axis.

40. The assembly of claim 38 wherein the screw threads on the reservoir and cap member require more than one complete turn to secure the reservoir, and the cap member is releasably connectable to the spray gun by means requiring less than one complete turn.

41. The assembly of claim 1 wherein the opening is oversize relative to the flow requirements when the reservoir is connected to the spray gun in use, and the fluid outlet provided by the spout is of reduced cross-section relative to the opening, wherein the opening permits fast-filling of the reservoir when the cap member is detached from the reservoir for adding fluid to the reservoir through the opening.

* * * * *

UNITED STATES PATENT AND TRADEMARK OFFICE

CERTIFICATE OF CORRECTION

PATENT NO. : 7,845,582 B2
APPLICATION NO. : 10/534093
DATED : December 7, 2010
INVENTOR(S) : Stephen Christopher Joseph It is certified that error appears in the above-identified patent and that said Letters Patent is hereby corrected as shown below:

Column 2,
Line 49, delete "foundry." and insert -- foundry --.

Column 9,
Line 9, delete "0-ring" and insert -- O-ring --.

Column 11,
Line 16, delete "embodiment;" and insert -- embodiment, --.
Line 41, delete "flat's" and insert -- flats --.

Signed and Sealed this
First Day of March, 2011

David J. Kappos

*Director of the United States Patent and Trademark Office*